(12) United States Patent
Abd Elhamid et al.

(10) Patent No.: US 7,972,449 B2
(45) Date of Patent: Jul. 5, 2011

(54) CORROSION RESISTANT METAL COMPOSITE FOR ELECTROCHEMICAL DEVICES AND METHODS OF PRODUCING THE SAME

(75) Inventors: Mahmoud H. Abd Elhamid, Grosse Pointe Woods, MI (US); Youssef M. Mikhail, Sterling Heights, MI (US); Gayatri Vyas Dadheech, Rochester Hills, MI (US); Feng Zhong, Troy, MI (US); Richard H. Blunk, Macomb Township, MI (US); Daniel J. Lisi, Eastpointe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 31 days.

(21) Appl. No.: 11/968,890

(22) Filed: Jan. 3, 2008

(65) Prior Publication Data

US 2009/0176142 A1 Jul. 9, 2009

(51) Int. Cl.
*C23C 8/50* (2006.01)
(52) U.S. Cl. .......................... 148/231; 148/228; 148/230
(58) Field of Classification Search .................... 429/34; 148/217, 218, 228, 231, 238
See application file for complete search history.

(56) References Cited

U.S. PATENT DOCUMENTS

| | | | |
|---|---|---|---|
| 4,556,607 A * | 12/1985 | Sastri | 428/627 |
| 4,836,865 A * | 6/1989 | Sakakima et al. | 148/306 |
| 6,436,568 B1 * | 8/2002 | Schilling et al. | 429/35 |
| 2003/0190515 A1 | 10/2003 | Brady et al. | |
| 2003/0228510 A1 * | 12/2003 | Nakata et al. | 429/34 |
| 2005/0238873 A1 | 10/2005 | Brady et al. | |
| 2006/0053627 A1 * | 3/2006 | Budinski et al. | 29/890 |
| 2006/0154131 A1 | 7/2006 | Seido et al. | |

FOREIGN PATENT DOCUMENTS

JP 01205045 A * 8/1989

OTHER PUBLICATIONS

H.-P. Feng, C.-H. Hsu, J.-K. Lu, Y.-H. Shy. Effects of PVD sputtered coatings on the corrosion resistance of AISI 304 stainless steel, Materials Science and Engineering 2003, A347, 123-129.*
R.F. Silva, D. Franchi, A. Leone, L. Pilloni, A. Masci, A. Pozio. Surface conductivity and stability of metallic bipolar plate materials for polymer electrolyte fuel cells, Electrochimica Acta 2006, 51, 3592-3598.*
M.P. Brady, P.F. Tortorelli, L.K. More, E.A. Payzant, B.L. Armstrong, H.-T. Lin, M.J. Lance, F. Huang, M.L Weaver. Coating and near-surface modification design strategies for protective and functional surfaces, Materials and Corrosion 2005, 56(11), 748-755.*
H. Wang, M.P. Brady, G. Teeter, J.A. Turner. Thermally nitrided stainless steels for polymer electrolyte membrane fuel cell bipolar plates Part 1: Model Ni-50Cr and austenitic 349TM alloys, Journal of Power Sources 2004, 138, 86-93.*
M. P. Brady et al, Growth of Cr-Nitrides on Commercial Ni-Cr and Fe-Cr Base Alloys to Protect PEMFC Bipolar Plates, International Journal of Hydrogen Energy 32 (2007) 3778-3788.
W. -S. Jeon et al, Electrochemical Properties of TiN Coatings on 316L Stainless Steel Separator for Polymer Electrolyte Membrane Fuel Cell, Science Direct Thin Solid Films 516 (2008) 2669-3672.

* cited by examiner

*Primary Examiner* — Jennifer K. Michener
*Assistant Examiner* — Carlos Barcena
(74) *Attorney, Agent, or Firm* — Reising Ethington P.C.

(57) ABSTRACT

A metal composite for use in electrochemical devices is disclosed. The metal composite comprises a stainless steel interior component and a deposited nitrided metal exterior layer, wherein the nitrided exterior layer has lower electric contact resistance and greater corrosion resistance than the stainless steel interior component. A bipolar plate made of such metal composite and methods of producing the metal composite and bipolar plate are also disclosed.

2 Claims, 3 Drawing Sheets

CORROSION RESISTANT METAL COMPOSITE FOR ELECTROCHEMICAL DEVICES AND METHODS OF PRODUCING THE SAME

TECHNICAL FIELD

The disclosed embodiments generally relate to metal composites having high corrosion resistance and low electric contact resistance for use in electrochemical devices such as fuel cells and batteries.

BACKGROUND

Electrochemical devices such as fuel cells and batteries typically involve corrosive electrochemical reactions and high electric current flow. Some of the key components of such electrochemical devices require high corrosion resistance and very low electric resistance for long product life and minimal energy loss. Bipolar plates in a polymer electrolyte membrane (PEM) fuel cell, for example, must be cost effective, electrochemically stable, electrically conductive, hydrophilic, and stampable. Sophisticated designs with flow channels on both sides of the plate can be formed by a metal stamping process. Stainless steels posses some of those desirable characteristics including low cost and stampability. The presence of the passive oxide film on the surface of stainless steel, however, creates an extensive contact resistance with the gas diffusion medium. In addition, typical stainless steels do not have the corrosion resistance required for a bipolar plate in a demanding fuel cell. Corrosion of a bipolar plate also results in metal ion contamination that adversely affects the performance of a fuel cell. A conductive coating of noble metals, such as gold, has been used to minimize the electric contact resistance of the stainless steel. Noble metal coating adds significantly to the cost of the bipolar plate. Thermal nitriding of certain types of stainless steel has also been disclosed. Relatively expensive types of stainless steel are required in order to achieve the desired corrosion resistance and low electric contact resistance. The thermal nitriding process inherently generates a non-uniform and heterogeneous surface layer. Desired consistency and reliability may be difficult to achieve in large volume production using a thermal nitriding process. There is thus a need for a low cost, highly corrosion resistant, and highly conductive material for electrochemical devices.

SUMMARY OF EXEMPLARY EMBODIMENTS OF THE INVENTION

One embodiment of the invention includes a metal composite comprising a low cost stainless steel interior component and a deposited nitrided metal exterior layer. The nitrided exterior layer has lower electric contact resistance and greater corrosion resistance than the stainless steel interior component. The nitrided exterior layer may be deposited on the stainless steel interior component using various metal coating/surface deposition methods including sputtering method to form a highly consistent, conductive and corrosion resistant surface layer.

In another embodiment, a bipolar plate for use in an electrochemical fuel cell comprises a stainless steel sheet material having a plurality of channels on at least one side and a deposited nitrided metal layer covering substantially the exterior surface of the stainless steel sheet. The nitrided metal has greater corrosion resistance and lower electric contact resistance than the stainless steel. The channels on the stainless steel sheet may be created by a conventional stamping process.

Other exemplary embodiments of the present invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

Figure 1:
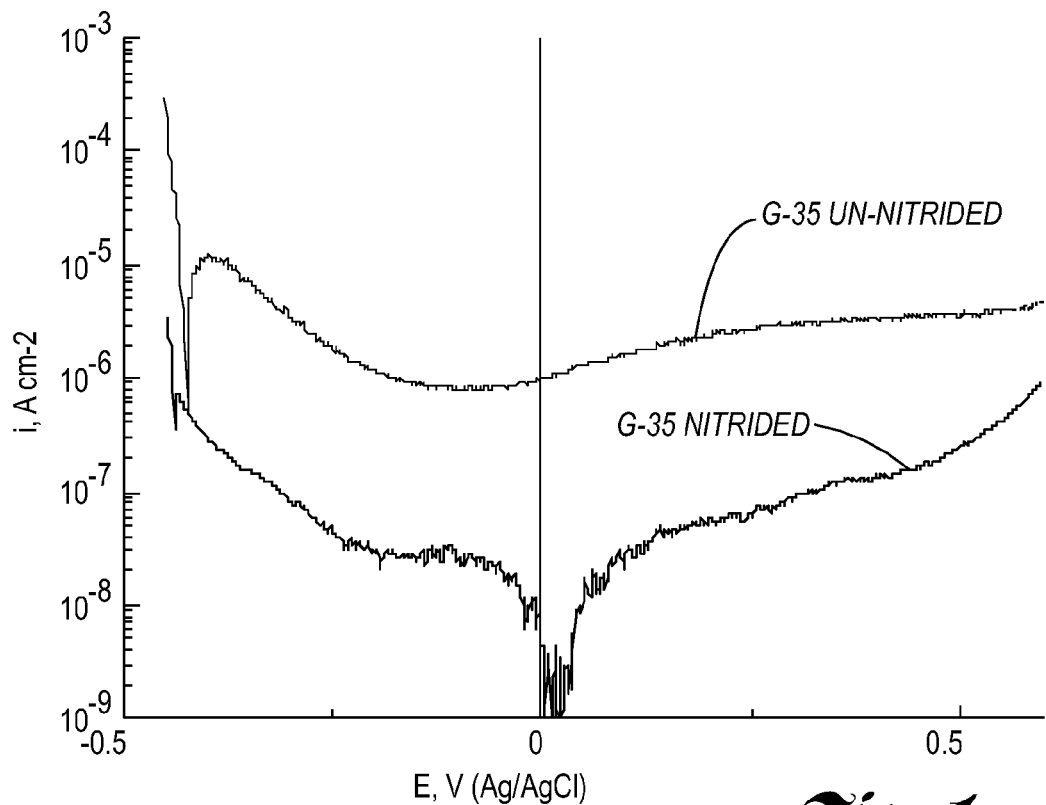
FIG. 1 is a graph showing potentiodynamic polarization curves of HASTELLOY G-35 alloy and the corresponding thermally nitrided G-35 alloy.

The following description of the embodiment(s) is merely exemplary in nature and is in no way intended to limit the invention, its application, or uses.

A metal composite with high corrosion resistance and low electric contact resistance is provided. The metal composite comprises a stainless steel interior component and a deposited nitrided metal exterior layer. The stainless steel interior component is typically a low cost metal alloy, and may not have the corrosion resistance or electric contact resistance required for use in a demanding electrochemical device. The deposited nitrided metal exterior layer strongly adheres to the stainless steel component, and typically covers substantially the surface of the stainless steel. The nitrided metal layer exhibits higher corrosion resistance and lower electric contact resistance than the stainless steel component.

Many different types of stainless steels can be used according to this invention. Typical stainless steels comprise at least 50% iron and at least 10% chromium by weight. The stainless steels may also include ferrite and austenite depending on their crystal structures and composition. It is preferred to use low cost stainless steels that can be easily made into thin sheets which can be stamped to form complicated channels. Stainless steels having higher electric conductivity and corrosion resistance are also preferred. In one embodiment, stainless steel having chromium content of at least 16% by weight is used. The stainless steel may also contain at least 6% nickel. Exemplary stainless steels may have nickel content of between 6-20% and chromium content of about 16% to about 20%. The stainless steel component may also include molybdenum which can further increase the corrosion resistance. In one embodiment, AISI type 304 and type 316 are used. The chemical composition of type 304 and type 316 are provided in Table 1 and Table 2 respectively:

TABLE 1

Typical Analysis of 304 Stainless Steel

| Carbon | 0.08% max. | Silicon | 1.00% max. |
|---|---|---|---|
| Manganese | 2.00% max. | Chromium | 18.00-20.00% |
| Phosphorus | 0.045% max. | Nickel | 8.00-10.50% |
| Sulfur | 0.030% max. | | |

TABLE 2

Typical Analysis of 316 Stainless Steel

| Carbon | 0.08% max. | Silicon | 1.00% max. |
|---|---|---|---|
| Manganese | 2.00% max. | Chromium | 16.00-18.00% |
| Phosphorus | 0.045% max. | Nickel | 10.00-14.00% |
| Sulfur | 0.030% max. | Molybdenum | 2.00-3.00% |

Although the stainless steel may be used in various forms including rod, wire, screw, slab, tube, ball, foam, and other complex shapes, stainless steel sheets are typically used. The sheet may be further processed into other shapes. In one embodiment, the stainless steel sheet is stamped to form a plurality of channels on at least one side. The plurality of channels can be used to direct gas or other fluids that flow through an electrochemical device. The channels may also be formed by etching, or other methods known to one of ordinary skill in the art.

A nitrided metal layer is deposited on the stainless steel component described above. The term "metal" here includes single component metal consisting of only one chemical element, metal alloys comprising 2 or more different chemical elements, and metal mixtures thereof. The nitrided metal is preferably deposited as substantially uniform layers with a thickness range from about 1 nm to about 10 µm. The nitrided metal layer has higher corrosion resistance and lower electric contact resistance than the stainless steel component.

The nitrided metal may be selected from metals comprising 0 to 50% iron by weight. The nitrided metal may comprise at least one metal element that favors the formation of a nitride. The nitride forming elements according to the invention include, but are not limited to, aluminum, chromium, tungsten, molybdenum, vanadium, titanium, niobium, tantalum, and zirconium. The nitrided metal may further comprise manganese and/or cobalt for better stabilization of the nitride. The nitrided metal preferably comprises greater than about 20% chromium and less than about 20% iron. In one embodiment, the nitrided metal is a nickel alloy comprising at least 40% nickel and at least 20% chromium. In another embodiment, the nitrided metal further comprises molybdenum at 1% or greater. Examples of such nitrided metals include nitrided products of HASTELLOY G-30 and G-35 alloy. The chemical compositions of HASTELLOY G-30 and G-35 are provided in Table 3.

Any nitriding processes known to one of ordinary skill in the art may be used according to this invention. Nitridation is generally conducted at a temperature in the range of 800° C. to 1200° C. in pure nitrogen or 96% nitrogen-4% hydrogen mixtures, although a temperature as low as 400° C. in ammonia environments is also suitable. There is no need to remove the passive oxide layer of the stainless steel before nitridation. Nitridation typically involves diffusion of nitrogen into metal and metal alloys at elevated temperatures and in controlled atmosphere to form nitrides on the surface of the metal and inside the metal. The controlled atmosphere for nitridation may include one or more of nitrogen gas, ammonia, hydrogen gas, or inert gases. A plasma assisted nitriding process can also be used at relatively low temperatures. Non-limiting examples of nitriding processes include Floe process, salt bath nitriding process, ion nitriding process, plasma assisted nitriding process, oxynitride process, ferritic nitrocarburizing process, and derivatized or combination processes thereof.

The nitrided metal can be deposited on the stainless steel interior component by various metal surface deposition or coating methods including, but not limited to, sputtering, ion plating, ion implanting, thermal spray coating, chemical vapor deposition or vacuum coating. Detailed descriptions of the above methods and other similar methods can be found in *Metals Handbook*, 9$^{th}$ Edition, volume 5, "Surface cleaning, Finishing, and Coating." In comparison with thermal nitriding surface treatment, the deposition method affords a broader selection of metal materials, a more uniform layer of nitrided layer, and better consistency.

A sputtering method is preferably used to deposit the nitrided metal layer. Sputtering is a process wherein material is ejected from the surface of a solid or liquid because of the momentum exchange associated with bombardment by energetic particles. The bombarding species are generally ions of a heavy inert gas. Argon is commonly used as the inert gas. The source of ions may be an ion beam or a plasma discharge into which the material to be bombarded is immersed. In the plasma-discharging sputter coating process, a source of coating materials called target (nitrided metal or metal to be nitrided and coated) is placed into a vacuum chamber which is evacuated and then backfilled with a working gas, such as argon or nitrogen containing gas or gas mixture. The gas pressure is adjusted to a level to sustain plasma discharge. A negative bias is then applied to the target so that it is bombarded by positive ions from the plasma. The sputter coating chamber is typically evacuated to pressures ranging from $10^{-3}$ to $10^{-5}$ Pascal before backfilling with argon to a pressure of 0.1 to 10 Pascal. The intensity of the plasma discharge, and thus the ion flux and sputtering rate that can be achieved, depend on the shape of the cathode electrode, and on the effective use of a magnetic field to confine the plasma electrons. Simple planar electrode and other electrode configurations can be used in such sputtering method. Compared with thermal nitriding and other surface processes, sputtering can be consistently done at low temperatures, for example less than 100° C.

TABLE 3

Typical chemical composition of HASTELLOY Alloy G-30 and G-35, wt %

| Alloy, % | Ni | Co | Cr | Mo | W | Fe | Si | Mn | C | Others |
|---|---|---|---|---|---|---|---|---|---|---|
| G-30 | 43 | <5.0 | 28.0-31.5 | 4-6 | 1.5-4.0 | 13-17 | <0.8 | <1.5 | <0.03 | Cu, Ta, Cb, P, and S |
| G-35 | 58 | | 33.2 | 8.1 | | <2 | <0.6 | | <0.05 | Cu |

In one embodiment, an un-nitrided metal is used as the coating or surface deposition starting material (or target if sputtering method is used). The un-nitrided metal has essentially the same composition as the deposited nitrided metal layer described previously in this disclosure except that nitrogen has not been incorporated into the metal. The surface coating/deposition is conducted in a nitrogen containing gas atmosphere such that the un-nitrided metal reacts with the nitrogen atmosphere to form the corresponding nitrided metal before depositing on the stainless steel substrate. In other words, nitriding and surface coating can be achieved in a single operation. In a non-limiting example, an un-nitrided metal starting material is used as the target in a sputtering process. Nitrogen, ammonia, or ammonia/hydrogen mixture is used as the working gas. The stainless steel interior component is used as the substrate. The un-nitrided metal target is then converted into nitrided metal during a sputtering process by reacting with the nitrogen containing working gas before depositing on the stainless steel substrate as a nitrided metal layer.

In another embodiment, a nitrided metal is used as the target in a sputtering process. The working gas is argon or another inert gas. The nitrided metal is deposited on the stainless steel substrate with virtually no chemical reaction with the working gas.

A post-treatment may be used after the deposition of the nitrided metal layer on the stainless steel interior component. Exemplary post-treatments include, but are not limited to, post-oxidation, additional thermal nitriding treatment, thermal treatment, annealing, carbiding, polishing, cleaning, polishing, etching and the like.

The metal composite according to this invention can be used as various parts or components in electrochemical devices such as batteries and fuel cells. The metal composite can be used as fitting materials, connecting tubes, and wall materials for the electrochemical cell chamber. The metal composite can be used as an electric coupling/connecting component that may come in contact with corrosive gas or liquid. The metal composite is particularly useful as the material for a bipolar plate in an electrochemical fuel cell due to its high corrosion resistance, low cost, and low electric contact resistance. To make a bipolar plate, a low cost stainless steel sheet interior component is first selected as described previously in this disclosure. A plurality of channels are created on such stainless steel sheet by stamping or another suitable method. The channels serve as the flow fields for the fuel gas and oxidant gas used in the fuel cell. A nitrided metal layer is deposited on the surface of the stainless steel sheet using sputtering or one of the other methods described previously in this disclosure. A bipolar plate made according to this invention can be used in a PEM fuel cell where a perfluorinated polymer electrolyte is used. The perfluorinated polymer electrolyte contains a significant amount of acid and a small amount of highly corrosive fluoride ion. In addition, a PEM fuel cell generally operates at elevated temperatures to provide high current density and efficiency. As a result, the bipolar plate must be highly resistant to corrosion in high acid, high temperature, and fluoride ion environment. The metal composite according to this invention exhibits all the desired characteristics as a bipolar plate for PEM fuel cells.

An electrochemical fuel cell can be manufactured using the metal composite described above as the bipolar plate. An electrochemical fuel cell, especially a PEM fuel cell, is typically produced by stacking a plurality of electrode assemblies and bipolar plates in an alternating manner. The electrode assembly may comprise an anode and a cathode that are respectively disposed on opposing sides of a membrane electrolyte. Such an electrode assembly is commonly referred to as membrane electrode assembly (MEA) in the technical field. The electrode assembly and metal composite bipolar plate are joined together in an alternating manner to form a fuel cell stack. A method of joining electrode assemblies and bipolar plates to form electrochemical fuel cells is further described in D. A. Landsman and F. J. Luczak, "Handbook of Fuel cells", John Wiley and Sons (2003).

Example 1

Corrosion Resistance and Electric Contact Resistance of Nitrided and Un-Nitrided Alloys Ex-situ corrosion experiments were conducted in a relatively harsh environment typically encountered inside PEM fuel cells under cyclic conditions of relative humidity, for example, between 40 to 100% RH. Both thermally nitrided and un-nitrided HASTELLOY G-30 and G-35 alloys were tested in a de-aerated simulated fuel cell solution containing 10 ppm hydrogen fluoride (HF) at pH of 3 at 80° C.

Figure 2:
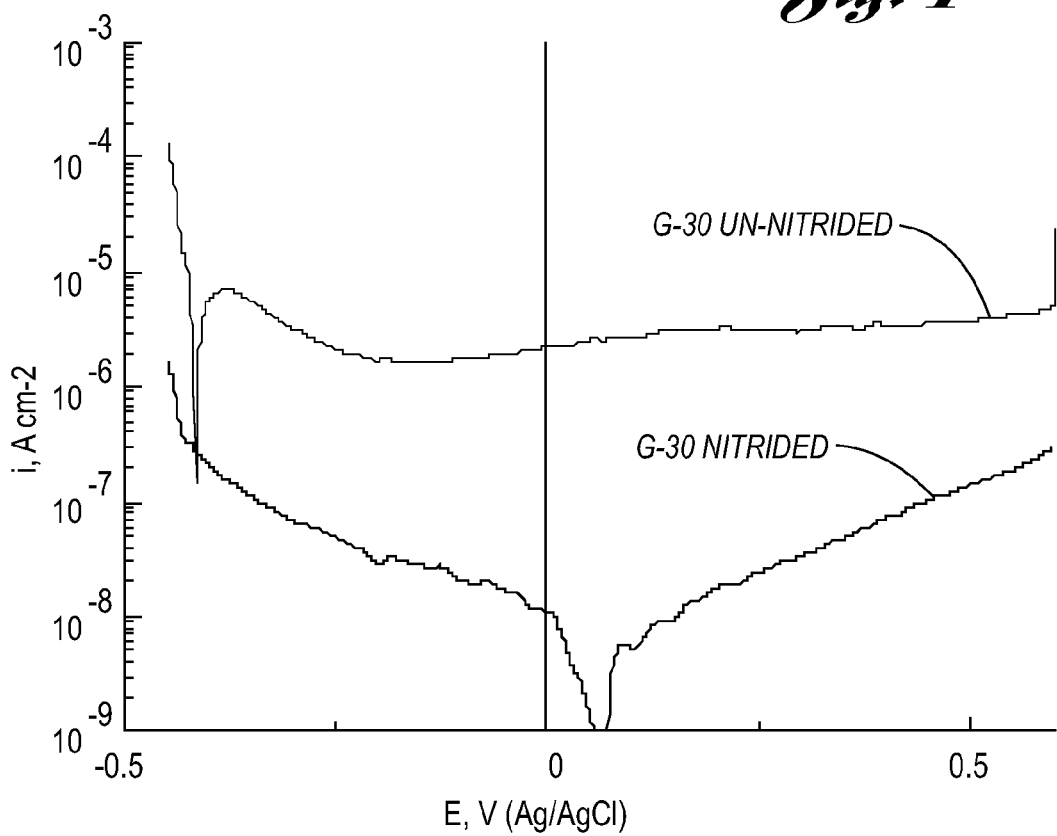
FIG. 2 is a graph showing potentiodynamic polarization curves of HASTELLOY G-30 alloy and the corresponding thermally nitrided G-30 alloy.

Potentiodynamic polarization curves of alloy G-35 and G-30 were obtained and are shown in FIG. 1 and FIG. 2 respectively. Both nitrided G-35 and G-30 alloys have lower current density by one order of magnitude than their corresponding un-nitrided coupons over the tested range of electrode potential. Lower current density in the potentiodynamic polarization test indicates lower rate of corrosion.

Figure 3:
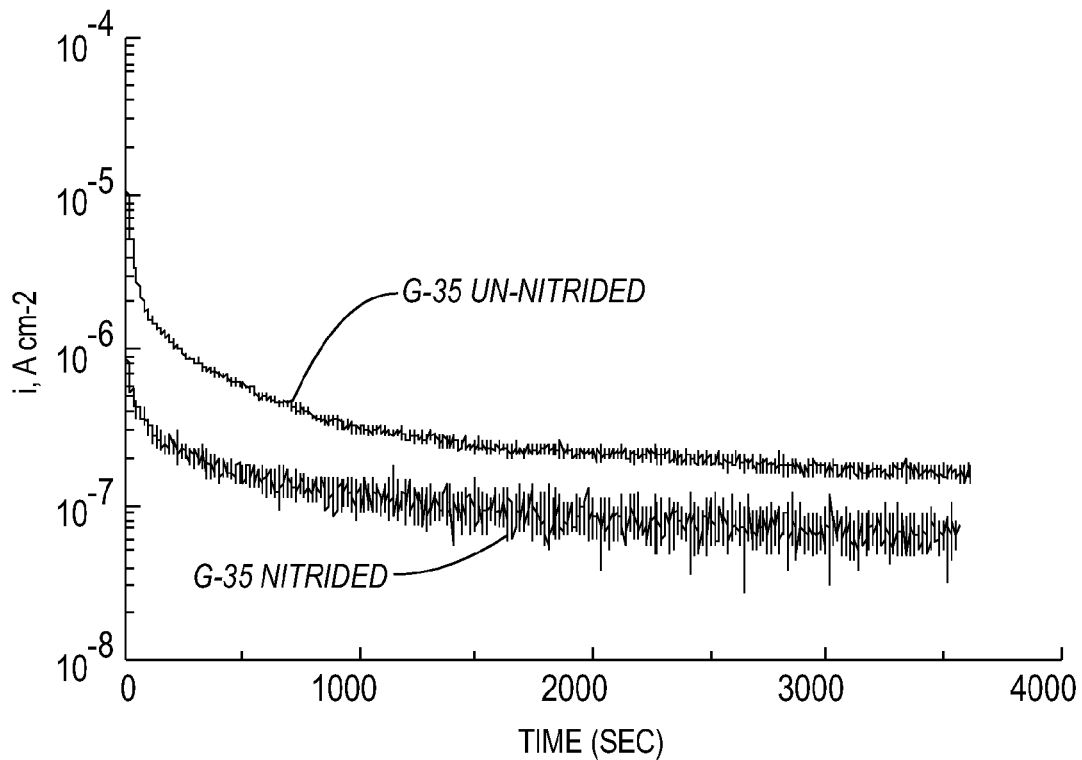
FIG. 3 is a graph showing potentiostatic current transients of HASTELLOY G-35 alloy and the corresponding thermally nitrided G-35 alloy.
Figure 4:
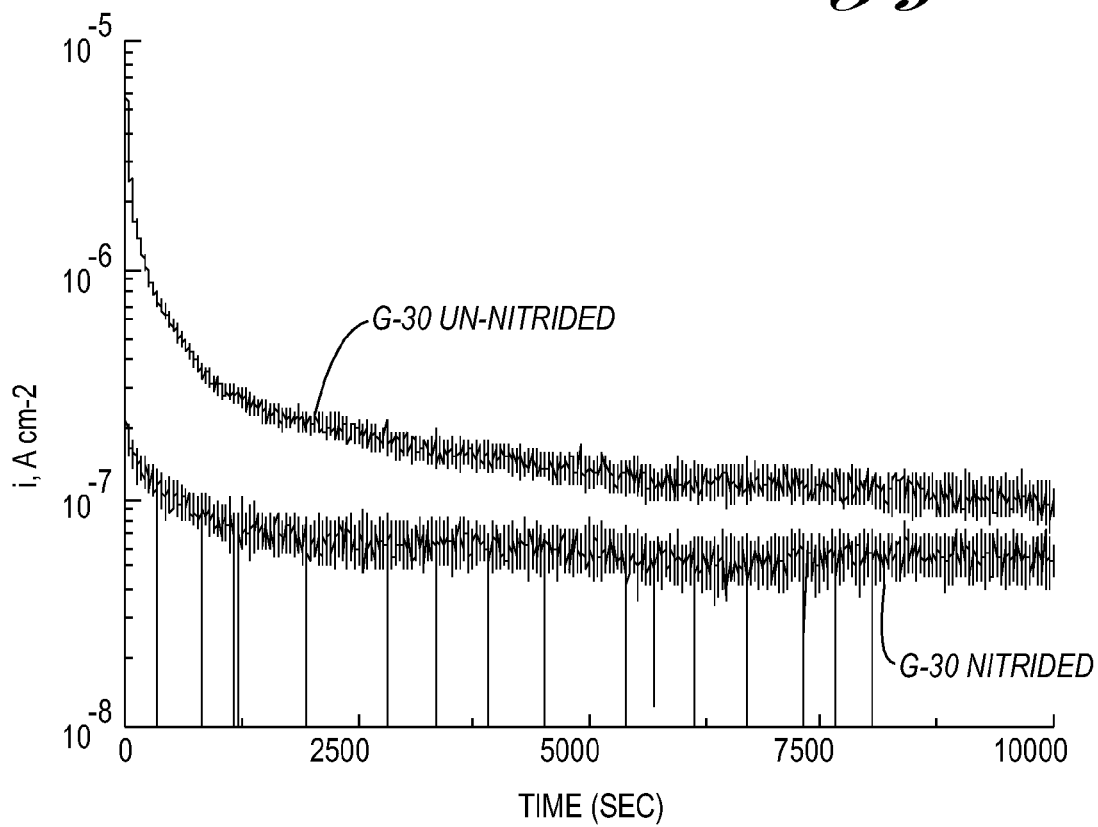
FIG. 4 is a graph showing potentiostatic current transients of HASTELLOY G-30 alloy and the corresponding thermally nitrided G-30 alloy.

Potentiostatic current transients were also obtained on thermally nitrided and un-nitrided G-35 and G-30 alloys at +0.6V (versus silver/silver chloride, Ag/AgCl, standard reference electrode) in argon purged simulated fuel cell solution containing 10 ppm HF at pH of 3 at 80° C., as shown in FIG. 3 and FIG. 4. The potentiostatic testing condition is similar to the corrosion environment near a PEM fuel cell cathode. Both the nitrided G-35 and G-30 alloys exhibited significantly lower current densities than their corresponding un-nitrided coupons. Again, lower current density indicates lower corrosion rate.

Electric contact resistance (ECR) of the metal samples before and after the potentiostatic test was also measured. The sample contact resistances were measured before and after the corrosion experiments using a four-probe technique. According to this method, the sample is sandwiched between two pieces of diffusion medium (DM), which in turn are sandwiched between two gold-plated copper electrodes. The sample is subjected to various compression pressures using a hydraulic press. A 1 A/cm$^2$ current density is then applied and the voltage drop is measured across the diffusion media or from DM-to-sample. Thus, the contact resistance at the stainless steel/DM interface can be measured at "stack" compression pressures.

The results are summarized in Table 3. As shown in Table 3, the nitrided G-30 and G-35 alloys have much lower electric contact resistance than their corresponding un-nitrided alloys. Additionally, nitrided alloys showed very little change in ECR after the corrosion test while ECR of un-nitrided alloys increased significantly under the same condition.

TABLE 3

Electric contact resistance of un-nitrided and nitrided alloys

| Alloy | ECR before the test, milli-ohms cm$^2$ | ECR after the test, milli-ohms cm$^2$ |
|---|---|---|
| G-30 | 29 | 130 |

TABLE 3-continued

Electric contact resistance of un-nitrided and nitrided alloys

| Alloy | ECR before the test, milli-ohms cm$^2$ | ECR after the test, milli-ohms cm$^2$ |
|---|---|---|
| un-nitrided G-30 | | |
| nitrided G-30 | 6.7 | 8.4 |
| G-35 un-nitrided | 26 | 43 |
| G-35 nitrided | 8 | 8.4 |

The above experiments demonstrate that a nitrided alloy has higher corrosion resistance and lower electric contact resistance than its corresponding un-nitrided alloy. The nitrided alloys would be suitable as the exterior layer of a polar plate in a fuel cell.

Example 2

Electrochemical Fuel Cell Having a Nitrided Alloy Bipolar Plate

Single fuel cell tests were carried out on machined and thermally nitrided G-35 (anode and cathode) metallic plates. A Global Tech. test station controlled by Scribner software was used to control the fuel cell potential and/or the current. A Gore 5051 membrane electrode assembly (MEA) with a 25 μm thickness and a 0.4 mg cm$^{-2}$ (each side) platinum loading was used. The experiments were done using hydrogen and air at a pressure of 25 psig, cyclic relative humidity and at a temperature of 80° C.

Figure 5:
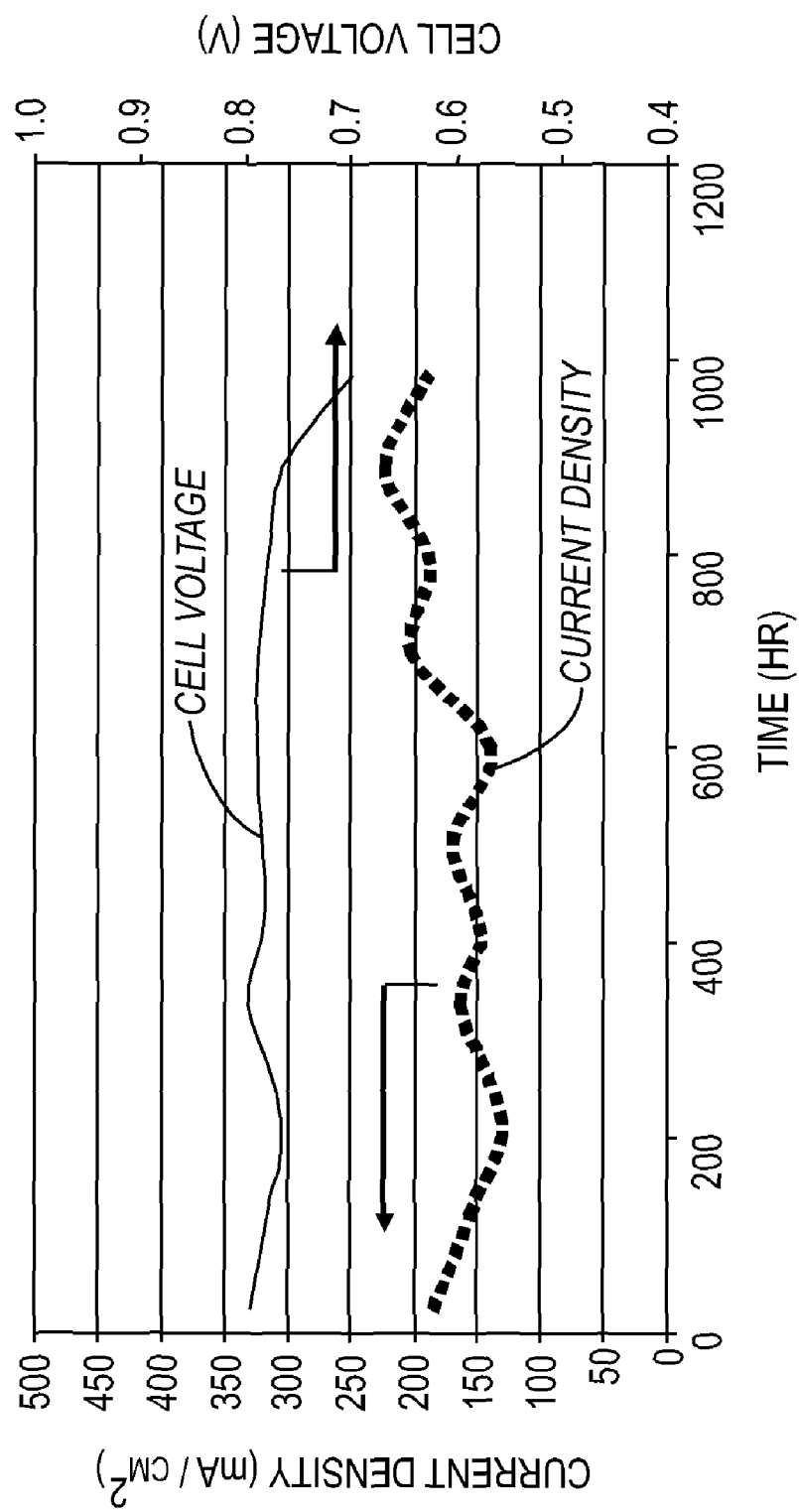
FIG. 5 is a graph showing the plot of a fuel cell's voltage and current density versus operating time. The fuel cell is a single unit fuel cell made of thermally nitrided HASTELLOY G-35 alloy as the bipolar plate and a GORE 5051 membrane electrode assembly operating at 80° C.

Nearly 900 durability hours were collected on the nitrided G-35 alloy with little change in cell voltage or current density as shown in FIG. 5. The results indicate that such nitrided alloys as an exterior layer for a bipolar plate would function very well in a fuel cell. Furthermore, ICP (Inductively Coupled Plasma) metal analysis of the product water collected from the fuel cell showed below detection limit values for the total metal ion contaminants. The ICP result further confirmed the robustness of the nitrided alloy as an exterior layer of a bipolar plate.

Example 3

Metal Composite Bipolar Plate

An AISI type 304 stainless steel sheet of 100 μm thick is stamped to create straight gas flow channels. A HASTELLOY G-35 alloy plate is thermally nitrided in nitrogen gas or in a nitrogen/hydrogen gas mixture at about 1000-1200° C. for about 2-8 hours. The stamped stainless steel as a substrate and the nitrided G-35 alloy foil as a target are placed in a sputtering chamber. The chamber is evacuated to about 10$^{-5}$ Pascal pressure, and backfilled with inert argon gas to about 0.1 to 10 Pascal pressure. Stable plasma is generated in the chamber. A negative bias is then applied to the nitrided G-35 alloy target to initiate the sputtering process. A relatively uniform layer of nitrided G-35 alloy of about 1 nm to about 3 μm is deposited on the outer surface of the stainless steel depending on the sputtering time. Thus a metal composite bipolar plate comprising a low cost stainless steel interior component and a nitrided alloy exterior layer is obtained. The bipolar plate can be then integrated with MBAs to form a single fuel cell unit and multiple fuel cell stack.

HASTELLOY G-30 has a composition including 28-31.5% Cr, 43% Ni, and 13-17% Fe by weight percent. HASTELLOY G-35 has a composition including 33.2% Cr, 58% Ni and <2% Fe by weight percent. AISI type 304 stainless steel has a composition including 18-20% Cr, 8-10.5% Ni and 60% Fe by weight percent. AISI type 316 stainless steel has a composition including 16-18% Cr, 10-14% Ni and 60% Fe by weight percent.

The above description of embodiments of the invention is merely exemplary in nature and, thus, variations thereof are not to be regarded as a departure from the spirit and scope of the invention.

What is claimed is:

1. A method of producing a metal composite for use in an electrochemical device comprising:
   providing a stainless steel component wherein the stainless steel is type 304 or type 316;
   having a plurality of channels formed in said stainless steel component;
   providing a metal alloy comprising 43 wt. percent Ni, less than 5 wt. percent Co, 28-31.5 wt. percent Cr, 4-6 wt. percent Mo, 1.5-4.0 wt. percent W, 13-17 wt. percent Fe.;
   placing said stainless steel component and said metal alloy in an inert gas or a nitrogen gas containing atmosphere; and
   depositing said metal alloy on an exterior surface of said stainless steel component to form a nitrided alloy exterior layer by sputtering, ion plating, ion implanting, chemical vapor deposition, plasma assisted metal deposition, or thermal spray coating, wherein the metal alloy comprises nitrogen or the depositing is conducted in a nitrogen atmosphere, and wherein the nitrided alloy exterior layer has a lower electrical contact resistance and a greater corrosion resistance than the stainless steel component.

2. A method of producing a metal composite for use in an electrochemical device comprising:
   providing a stainless steel component wherein the stainless steel is type 304 or type 316;
   having a plurality of channels formed in said stainless steel component;
   providing a metal alloy comprising 58 wt. percent Ni, 33.2 wt. percent Cr, 8.1 wt. percent Mo.;
   placing said stainless steel component and said metal alloy in an inert gas or a nitrogen gas containing atmosphere; and
   depositing said metal alloy on an exterior surface of said stainless steel component to form a nitrided alloy exterior layer by sputtering, ion plating, ion implanting, chemical vapor deposition, plasma assisted metal deposition, or thermal spray coating, wherein the metal alloy comprises nitrogen or the depositing is conducted in a nitrogen atmosphere, and wherein the nitrided alloy exterior layer has a lower electrical contact resistance and a greater corrosion resistance than the stainless steel component.

* * * * *